(12) United States Patent
Heravi et al.

(10) Patent No.: US 7,262,947 B2
(45) Date of Patent: Aug. 28, 2007

(54) LOW VOLTAGE INTERRUPTER FOR ELECTRIC WINCH

(75) Inventors: Oliver Heravi, Tigard, OR (US); Mitchell R Lawson, Vancouver, WA (US)

(73) Assignee: Warn Industries, Inc., Milwaukie, OR (US)

(*) Notice: Subject to any disclaimer, the term of this patent is extended or adjusted under 35 U.S.C. 154(b) by 616 days.

(21) Appl. No.: 10/799,141

(22) Filed: Mar. 12, 2004

(65) Prior Publication Data
US 2005/0211966 A1    Sep. 29, 2005

(51) Int. Cl.
*H02H 3/00* (2006.01)
(52) U.S. Cl. ......................................... 361/92
(58) Field of Classification Search ............... 361/92
See application file for complete search history.

(56) References Cited
U.S. PATENT DOCUMENTS 3,590,325 A * 6/1971 McMillen et al. ............ 361/92
4,873,474 A    10/1989 Johnson ....................... 318/434
5,214,359 A    5/1993 Herndon et al. ............. 318/434
5,648,887 A    7/1997 Herndon et al. .............. 361/31
6,046,893 A    4/2000 Heravi .......................... 361/23

* cited by examiner

*Primary Examiner*—Stephen W. Jackson
(74) *Attorney, Agent, or Firm*—Harness, Dickey & Pierce, P.L.C.

(57) ABSTRACT

A low voltage interrupt for an electric winch prevents voltage decay of a battery due to excessive operation of the winch. If the battery voltage decays below a threshold, the low voltage interrupt disables the winch, allowing an alternator to recharge the battery. A voltage sense circuit determines the voltage of the battery. The sensed voltage is compared to a predetermined threshold. If the sensed voltage decays below the threshold, the low voltage interrupt generates an interrupt signal. The interrupt signal causes a relay to actuate, thereby interrupting current to the winch.

16 Claims, 4 Drawing Sheets

LOW VOLTAGE INTERRUPTER FOR ELECTRIC WINCH

FIELD OF THE INVENTION

The present invention relates to an electric winch, and more particularly to compensating for a low voltage condition in a battery and/or charging system of an electric winch.

BACKGROUND OF THE INVENTION

Winches used to pull or lift heavy loads support a wide range of applications and assume a variety of sizes and types. Electrically-powered winches require a voltage supply to power the winch motor. A vehicle may incorporate a winch and power the winch with the vehicle battery and/or electrical system.

Frequent and excessive operation of the winch may result in an undue demand of current from the electrical supply. The current used by the winch may exceed the current supplied to the battery by a vehicle alternator. Continuous operation of the winch under this condition may cause the battery voltage to decay. Low battery voltage may cause performance issues with the winch or other electromechanical devices in the system. For example, low battery voltage reduces the speed of the winch motor, causing the motor to run for a longer period of time in order to pull a given load. Consequently, more heat is generated in the motor. Additionally, the battery may not be able to provide sufficient voltage to start the vehicle.

SUMMARY OF THE INVENTION

A low voltage interrupt system for an electric winch comprises an electrical supply that provides current to the electric winch. A voltage sense circuit determines a voltage of the electrical supply. A controller compares the voltage to a threshold voltage and generates an interrupt signal if the voltage is below the threshold voltage for a first period. A relay actuates in response to the interrupt signal, thereby interrupting the current to the electric winch.

In another aspect of the invention, a low voltage interrupt method for an electric winch comprises providing a current from an electrical supply to the electric winch. A voltage of the electrical supply is determined. The voltage is compared to a low voltage threshold. An interrupt signal is generated if the voltage is less than the low voltage threshold for a first period. The interrupt signal is received at a relay. The relay interrupts the current in response to the interrupt signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
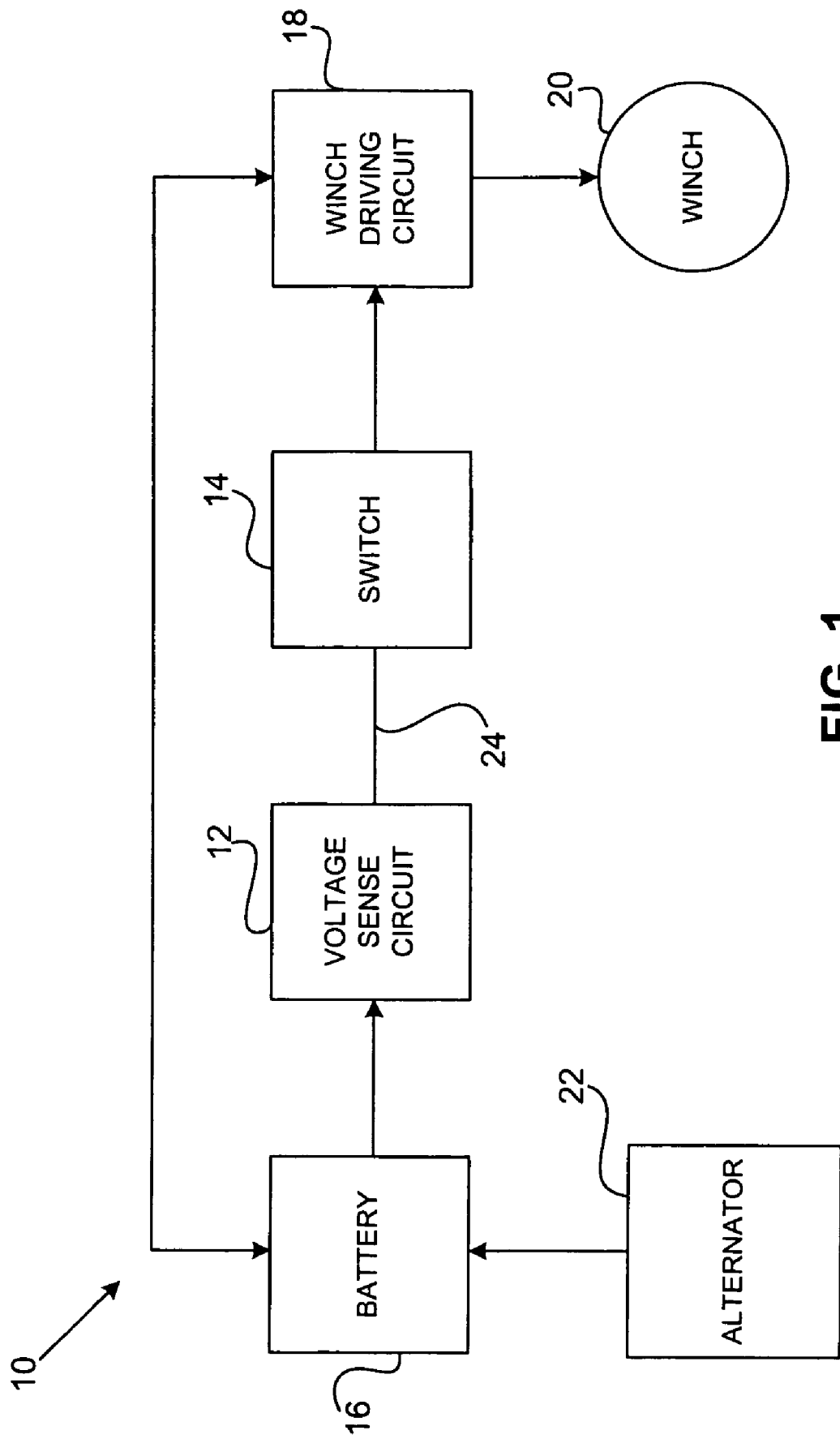
FIG. 1 is a functional block diagram of a low voltage interrupter circuit according to the present invention.

The following description of the preferred embodiment(s) is merely exemplary in nature and is in no way intended to limit the invention, its application, or uses. For purposes of clarity, the same reference numbers will be used in the drawings to identify similar elements.

A low voltage interrupter system 10 for an electric winch includes a voltage sense circuit 12 and a switch 14 as shown in FIG. 1. The voltage sense circuit 12 senses a voltage from a battery 16. The battery 16 supplies electrical power to various electro-mechanical devices in a vehicle having a winch system. For example, the battery 16 provides electrical power to vehicle accessories such as head lights, tail lights, the HVAC blower motor, and radio, as well as the voltage sense circuit 12, a winch driving circuit 18 including a solenoid pack, and an electric winch 20. As is known in the art, the battery 16 may provide electrical power to additional devices of the winch system.

The battery 16 is charged by an alternator 22 of a vehicle (not shown). However, operation of the winch 20 may drain the voltage of the battery 16 at a rate faster than the alternator 22 can charge the battery 16. For example, the battery 16 may provide a system voltage of approximately 12 v. Operation of the winch 20 may cause the battery 16 to provide a voltage less than 12 v. As a result, certain electrical or electro-mechanical functions in the system may not perform as desired. The performance or reliability of the battery 16 may be reduced due to a lower operating voltage. Similarly, the operating speed of the winch 20 may be reduced.

The voltage sense circuit 12 senses the voltage of the battery 16 to determine if the voltage is below a threshold voltage. The voltage sense circuit 12 is operable to sense the effective voltage of the battery 16 at any location in the winch system. If the voltage sense circuit 12 determines that the voltage of the battery 16 is below the threshold voltage, the voltage sense circuit 12 generates a low voltage interrupt signal 24. The switch 14 actuates to an open position in response to the low voltage interrupt signal 24. If the switch 14 is in an open position, the solenoid pack 18 does not receive electrical power from the battery 16. Therefore, operation of the winch 20 is interrupted. While the operation of the winch 20 is interrupted, the alternator 22 is able to charge the battery 16 more effectively.

Figure 2:
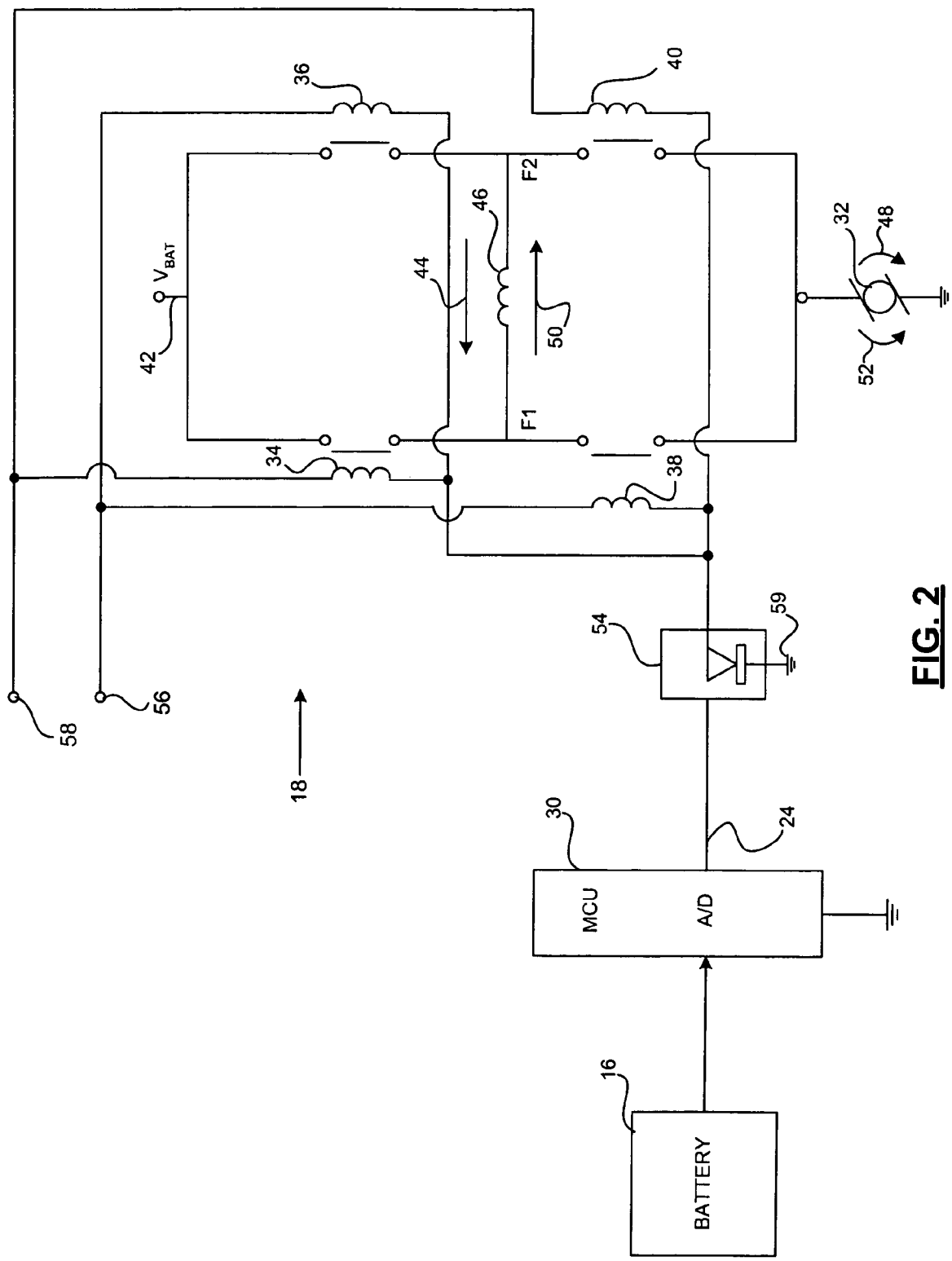
FIG. 2 is a circuit diagram of a low voltage interrupter circuit according to the present invention.

Referring now to FIG. 2, the low voltage sense circuit 12 comprises a microcontroller unit 30. The microcontroller unit 30 includes an analog-to-digital (A/D) converter that samples the voltage from the battery 16. The microcontroller unit 30 differentiates the actual voltage of the battery 16 from other voltages of the electrical system. Other factors affecting the voltage signal include a transient voltage caused by winch inrush current or ripple voltage caused by alternator rotation. Microcontroller, sampling, and other computational functions may be performed on an integrated circuit, as shown, or each may be performed by a dedicated circuit as is known in the art.

The winch driving circuit 18 selectively provides electrical energy to rotate a winch armature 32 in a first direction or a second direction as is known in the art. Additionally, the winch driving circuit 18 is operable to provide no electrical energy to the armature 32, thereby halting the operation of the winch. The winch driving circuit 18, for example, includes four solenoids 34, 36, 38, 40 in an H-bridge configuration. A voltage signal applied at solenoid pack terminals 56, 58 affects the operation of the solenoids 34, 36, 38, 40. For example, a voltage applied at a first terminal 56 energizes solenoids 36 and 38. Energizing solenoids 36 and 38 causes current to flow from an input terminal 42 in a direction 44. Current flow in direction 44 through a field 46 causes the armature 32 to rotate in a first direction 48. Conversely, a voltage applied at a second terminal 58 energizes solenoids 34 and 40. Energizing solenoids 34 and 40 causes current to flow from the input terminal 42 in a direction 50. Current flow in direction 50 through the field 46 causes the armature 32 to rotate in a second direction 52.

The switch 14 comprises, for example, a relay 54. The relay 54 provides a connection between the solenoid pack terminals 42, 44 and a ground 59, allowing current to flow selectively through the solenoids 34, 36, 38, 40. The relay 54 receives the low voltage interrupt signal 24 from the microcontroller unit 30. The low voltage interrupt signal 24 defaults to a first state wherein the relay 54 is closed. For example, the low voltage interrupt signal 24 may default to 0 v. If the voltage from the battery 16 drops below the threshold voltage, the microcontroller unit 30 causes the low voltage interrupt signal 24 to a second state. As a result, the relay 54 opens. With the relay 54 in an open position, all of the solenoids 34, 36, 38, 40 are de-energized. Therefore, the armature 32 does not receive electrical energy from the winch driving circuit 18, causing operation of the winch to halt.

Figure 3:
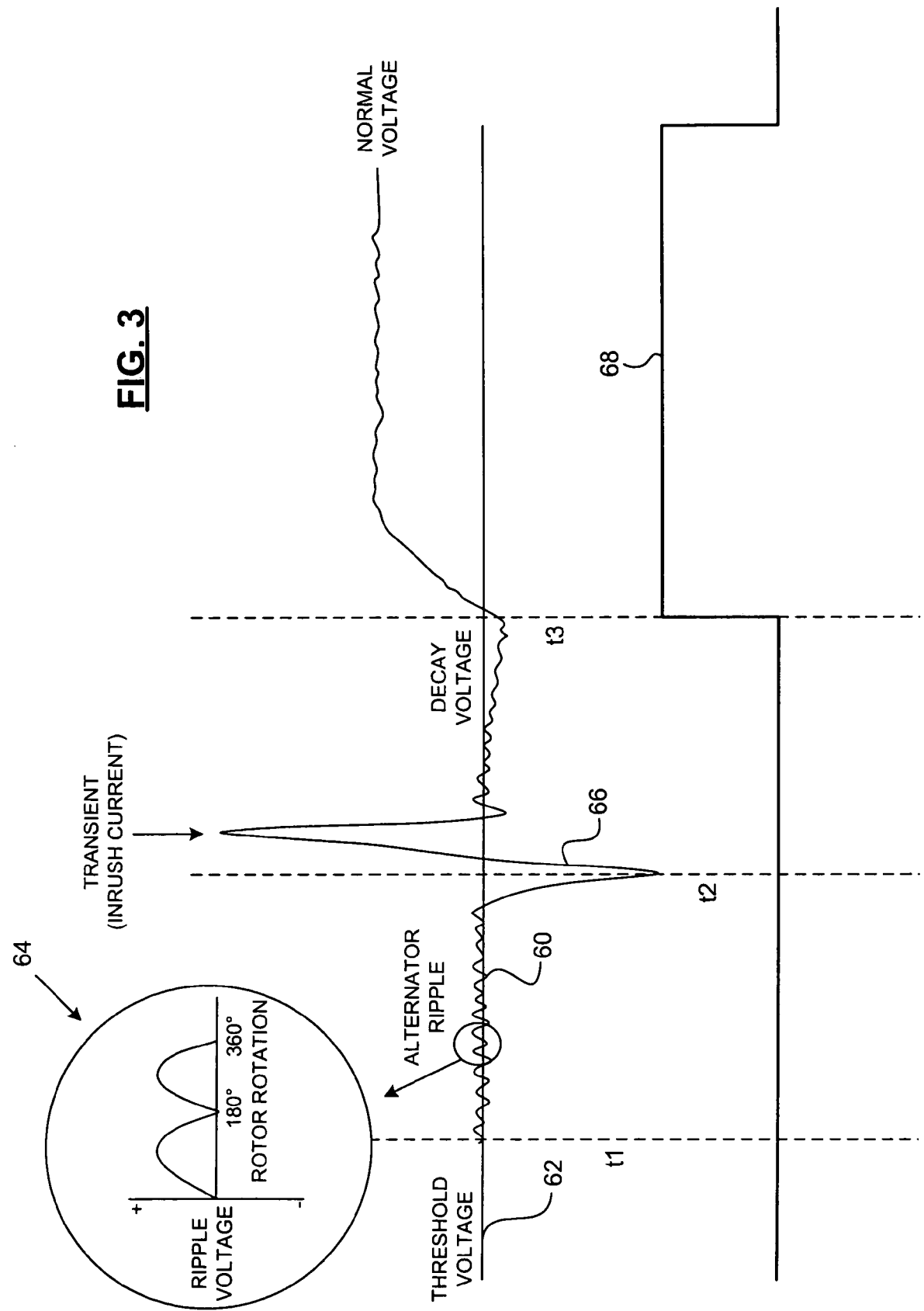
FIG. 3 graphically illustrates a battery voltage signal and a low voltage interrupt signal according to the present invention.

The low voltage interrupt signal 24 is generated in response to the voltage signal 60 from the battery as shown in FIG. 3. At time t1, the voltage signal 60 is approximately equal to or slightly above the threshold voltage 62. For example, a nominal voltage of the voltage signal 60 may be 12 v, and the threshold voltage 62 may be 10 v. The low voltage interrupt signal 24 is a first state at time t1. While the voltage signal 60 provided by the battery is a DC voltage, the operation of the alternator may cause a ripple voltage 64 in the voltage signal 60. In certain circumstances, the ripple voltage 64 may cause the voltage signal 60 to drop below the threshold voltage 62. The voltage signal 60 may be rectified or filtered to minimize the effect of the ripple voltage 64.

An inrush current causes a transient voltage 66 at time t2. The inrush current is a result of the beginning of the operation of the winch. The alternator is not able to charge the battery enough to compensate for the voltage required by the winch. Therefore, the voltage signal 60 begins to decay. At time t3, the microcontroller senses that the voltage signal 60 has decayed below the threshold voltage 62. The microcontroller causes the voltage interrupt signal 24 to change from the first state to a second state. For example, the voltage interrupt signal 24 may change from 0 v to 5 v. When the voltage interrupt signal 24 is the second state, the relay of FIG. 2 is energized, interrupting the current through the solenoids. The relay is energized for a predetermined period 68 to allow the alternator to charge the battery. For example, the predetermined period 68 may be 30 seconds. After the predetermined period 68 is elapsed, the microcontroller determines if the voltage signal 60 is still below the threshold voltage 62. If the voltage signal 60 is below the threshold voltage 62 after the predetermined period 68, the microcontroller continues to energize the relay. Alternatively, the relay may be energized until the microcontroller senses that the voltage signal 60 is charged above the threshold voltage 62.

Figure 4:
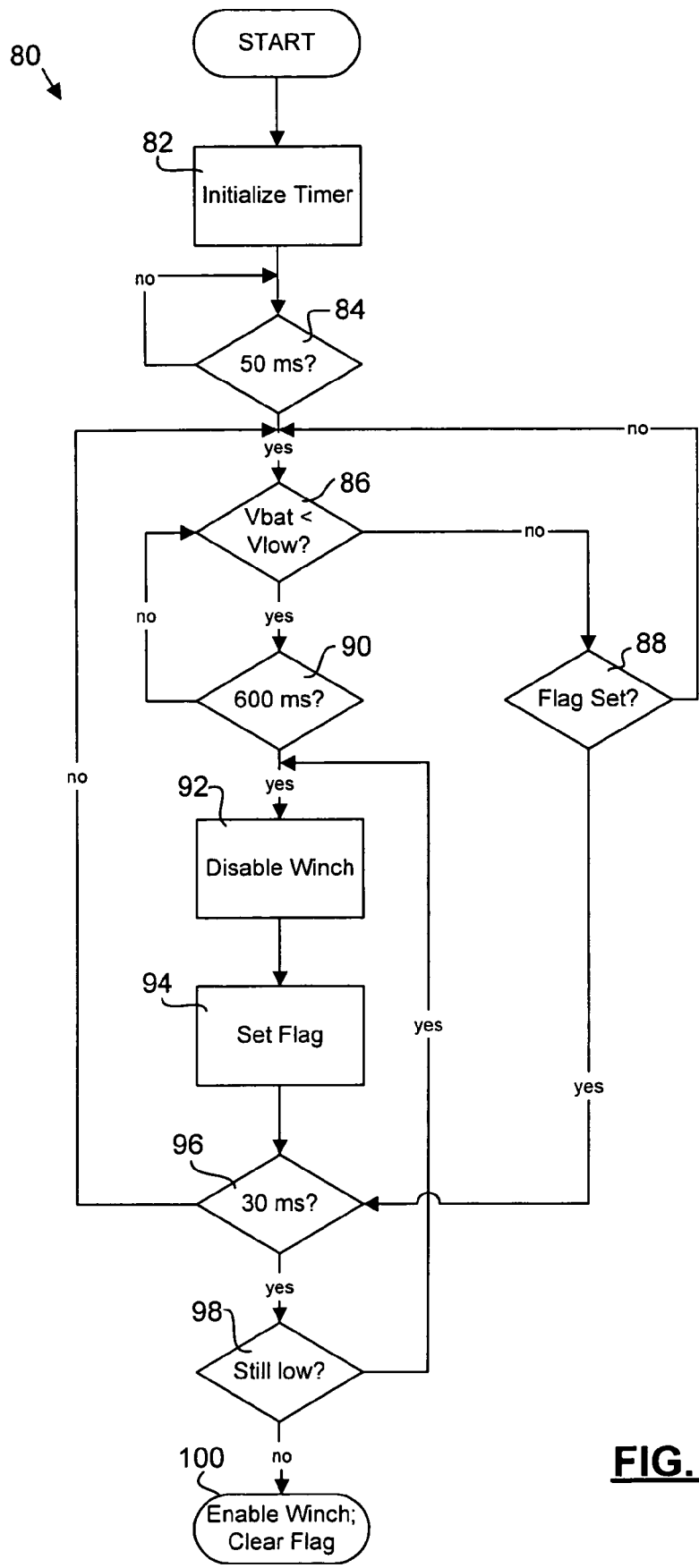
FIG. 4 is a flow diagram of a low voltage interrupter algorithm according to the present invention.

A low voltage interrupter algorithm 80 is shown in FIG. 4. The algorithm 80 starts at the power-up of the vehicle or winch system. A startup timer is initialized at step 82. The startup timer ensures that the algorithm 80 does not initiate a low voltage interrupt prematurely. The electrical system of the vehicle may be unstable immediately after power-up, resulting in an unstable voltage signal. At step 84, the algorithm 80 determines if a proper startup period has elapsed. In an exemplary embodiment, the startup period is 50 ms. If the startup timer has not reached 50 ms, step 84 is repeated. After the startup timer reaches the proper period, the algorithm 80 continues to step 86.

At step 86, the algorithm 80 determines if the voltage signal from the battery is below the low voltage threshold. If the voltage signal is not below the low voltage threshold, the algorithm continues to step 88. If the voltage signal is below the low voltage threshold, the algorithm 80 determines if the voltage signal bas been below the low voltage threshold for a low voltage period at step 90. In an exemplary embodiment, the low voltage period is 600 ms. During operation of the winch, system noise or voltage transients may cause the voltage signal to fall below the low voltage threshold temporarily. The low voltage period ensures that the algorithm 80 does not initiate a low voltage interrupt due to a temporary voltage drop. If the voltage signal is not below the low voltage threshold for 600 ms, the algorithm 80 continues to check the voltage signal at step 86. If the voltage signal is below the low voltage threshold continuously for 600 ms, the algorithm 80 disables the winch motor at step 92.

A flag is set at step 94 to indicate that the algorithm 80 initiated a low voltage interrupt. An interrupt timer is checked at step 96 to determine if the low voltage interrupt has been active for a disable period. The interrupt timer ensures that the winch motor is disabled for the disable period before allowing the algorithm 80 to re-enable the winch motor. In the preferred embodiment, the disable period is 30 seconds. If the disable period has not elapsed, the algorithm 80 checks the voltage signal again at step 86. If the voltage signal is still below the low voltage threshold, the algorithm 80 continues through to step 96 to recheck the disable period. If the voltage signal is not below the low voltage threshold, the algorithm 80 determines if the flag was previously set at step 88. If the flag was set, the algorithm 80 continues to step 96. If the flag was not set, the algorithm 80 returns to step 86.

If the disable period is elapsed at step 96, the algorithm 80 rechecks the voltage signal at step 98. If the voltage signal is still below the low voltage threshold, the algorithm 80 returns to step 92. If the voltage signal is above the low voltage threshold, the algorithm 80 enables the winch motor and clears the flag at step 100. The algorithm then continues to check for a low voltage signal at step 84. In alternative embodiments, the algorithm 80 may require that the voltage signal increase to a second threshold. For example, the algorithm 80 may continue with the winch motor disabled until the voltage signal attains a specific voltage level above the low voltage threshold.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A low voltage interrupt system for an electric winch comprising:

a vehicle electrical supply that provides current to the electric winch;

a voltage sense circuit that determines a voltage of the vehicle electrical supply;

a controller that compares the voltage to a threshold voltage at a first instance and generates an interrupt signal if the voltage is below the threshold voltage for a first period; and a relay that actuates in response to the interrupt signal, thereby interrupting the current to the electric winch, wherein the first period is greater than or equal to a timed low voltage period.

2. The system of claim 1 wherein the vehicle electrical supply includes a battery.

3. The system of claim 1 wherein the voltage sense circuit includes an A/D converter that samples the voltage of the vehicle electrical supply.

4. A low voltage interrupt system for an electric winch comprising:

a vehicle electrical supply that provides current to the electric winch;

a voltage sense circuit that determines a voltage of the vehicle electrical supply;

a controller that compares the voltage to a threshold voltage at a first instance and generates an interrupt signal if the voltage is below the threshold voltage for a first period; and a relay that actuates in response to the interrupt signal, thereby interrupting the current to the electric winch, wherein the relay interrupts the current for a second period and the second period is greater than or equal to a timer period.

5. The system of claim 4 wherein the controller compares the voltage to the threshold voltage at a second instance after the second period.

6. The system of claim 5 wherein the controller terminates the interrupt signal if the voltage is not below the threshold voltage after the second period.

7. The system of claim 1 further comprising an alternator that recharges the vehicle electrical supply.

8. The system of claim 4 wherein the controller compares the voltage to an enable voltage at a second instance after the second period, wherein the enable voltage is greater than the threshold voltage.

9. The system of claim 8 wherein the controller terminates the interrupt signal if the voltage is not below the enable voltage after the second period.

10. A low voltage interrupt method for an electric winch comprising:

providing a current from a vehicle electrical supply to the electric winch;

determining a voltage of the vehicle electrical supply;

comparing the voltage to a low voltage threshold at a first instance;

generating an interrupt signal if the voltage is less than the low voltage threshold for a first period; and receiving the interrupt signal at a relay that interrupts the current in response to the interrupt signal, wherein the first period is greater than or equal to a timed low voltage period.

11. The method of claim 10 wherein the step of determining the voltage includes sampling the voltage at an A/D converter.

12. A low voltage interrupt method for an electric winch comprising:

providing a current from a vehicle electrical supply to the electric winch;

determining a voltage of the vehicle electrical supply;

comparing the voltage to a low voltage threshold at a first instance;

generating an interrupt signal if the voltage is less than the low voltage threshold for a first period; and receiving the interrupt signal at a relay that interrupts the current in response to the interrupt signal, wherein the step of interrupting the current includes interrupting the current for a second period that is greater than or equal to a timer period.

13. The method of claim 12 further comprising comparing the voltage to the low voltage threshold at a second instance after the second period.

14. The method of claim 13 further comprising terminating the interrupt signal if the voltage is not below the low voltage threshold after the second period.

15. The method of claim 12 further comprising comparing the voltage to an enable voltage threshold at a second instance after the second period, wherein the enable voltage is greater than the low voltage threshold.

16. The method of claim 15 further comprising terminating the interrupt signal if the voltage is not below the enable voltage threshold after the second period.

* * * * *

UNITED STATES PATENT AND TRADEMARK OFFICE
CERTIFICATE OF CORRECTION

PATENT NO. : 7,262,947 B2  Page 1 of 1
APPLICATION NO. : 10/799141
DATED : August 28, 2007
INVENTOR(S) : Heravi et al.

It is certified that error appears in the above-identified patent and that said Letters Patent is hereby corrected as shown below:

Col. 4, line 21, please delete "bas" and insert --has-- therefor.

Signed and Sealed this

Eighteenth Day of March, 2008

JON W. DUDAS
*Director of the United States Patent and Trademark Office*